United States Patent
Tseng et al.

(10) Patent No.: US 11,700,596 B2
(45) Date of Patent: Jul. 11, 2023

(54) METHODS AND APPARATUSES FOR SIDELINK OPERATIONS

(71) Applicant: FG Innovation Company Limited, Tuen Mun (HK)

(72) Inventors: Yung-Lan Tseng, Taipei (TW); Hung-Chen Chen, Taipei (TW); Mei-Ju Shih, Taipei (TW); Chia-Hao Yu, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/038,458

(22) Filed: Sep. 30, 2020

(65) Prior Publication Data

US 2021/0105775 A1    Apr. 8, 2021

Related U.S. Application Data

(60) Provisional application No. 62/910,564, filed on Oct. 4, 2019.

(51) Int. Cl.
*H04W 72/0453* (2023.01)
*H04W 56/00* (2009.01)
*H04W 4/40* (2018.01)

(52) U.S. Cl.
CPC ......... *H04W 72/0453* (2013.01); *H04W 4/40* (2018.02); *H04W 56/0005* (2013.01)

(58) Field of Classification Search
CPC ............... H04W 72/0453; H04W 4/40; H04W 56/0005; H04W 72/1215; H04W 72/02
See application file for complete search history.

(56) References Cited

U.S. PATENT DOCUMENTS

| | | | |
|---|---|---|---|
| 2018/0035416 A1* | 2/2018 | Yi | H04W 72/0406 |
| 2019/0075548 A1 | 3/2019 | Lee et al. | |
| 2019/0215801 A1* | 7/2019 | Mok | H04W 72/02 |
| 2019/0373427 A1* | 12/2019 | Park | H04W 72/042 |
| 2020/0120625 A1* | 4/2020 | Park | H04W 4/40 |
| 2020/0229114 A1* | 7/2020 | Ryu | H04L 5/0091 |

(Continued)

FOREIGN PATENT DOCUMENTS

| | | |
|---|---|---|
| CN | 109526255 A | 3/2019 |
| CN | 101971548 A | 9/2019 |
| WO | 2018168169 A1 | 9/2018 |

OTHER PUBLICATIONS

Catt, Cell (Re-) selection Function in NR V2X Sidelink, 3GPP TSG-RAN WG2 Meeting #106, R2-1905799, May 17, 2019, section 2.

(Continued)

*Primary Examiner* — Yu-Wen Chang
(74) *Attorney, Agent, or Firm* — ScienBiziP, P.C.

(57) ABSTRACT

A user equipment (UE) includes one or more non-transitory computer-readable media containing computer-executable instructions embodied therein and at least one processor coupled to the one or more non-transitory computer-readable media. The at least one processor is configured to receive an indicator indicating that a Long-Term-Evolution (LTE)-Vehicle to Everything (V2X) sidelink (SL) communication is shared with New Radio (NR) SL communication on at least one of one or more carrier frequencies, and select one of the one or more carrier frequencies for the NR SL communication.

18 Claims, 6 Drawing Sheets

(56) References Cited

U.S. PATENT DOCUMENTS

| | | | |
|---|---|---|---|
| 2020/0396734 A1* | 12/2020 | Li | H04W 72/0406 |
| 2021/0022142 A1* | 1/2021 | Wu | H04L 1/1864 |
| 2021/0051614 A1* | 2/2021 | Gulati | H04W 72/02 |
| 2021/0058917 A1* | 2/2021 | Abedini | H04W 72/0433 |
| 2021/0168574 A1* | 6/2021 | Zhang | H04W 56/001 |
| 2021/0176720 A1* | 6/2021 | Chae | H04W 92/18 |
| 2021/0258121 A1* | 8/2021 | Liu | H04W 72/042 |
| 2021/0274457 A1* | 9/2021 | Zhao | H04L 5/0048 |
| 2021/0314929 A1* | 10/2021 | Li | H04W 72/10 |
| 2021/0321421 A1* | 10/2021 | Osawa | H04W 72/10 |
| 2021/0377893 A1* | 12/2021 | Khoryaev | H04W 56/002 |
| 2021/0400633 A1* | 12/2021 | Ali | H04W 72/02 |
| 2021/0400638 A1* | 12/2021 | Lee | H04W 4/40 |
| 2022/0006677 A1* | 1/2022 | Luo | H04L 5/0057 |
| 2022/0095276 A1* | 3/2022 | Aiba | H04W 72/542 |

OTHER PUBLICATIONS

LG Electronics, Considerations on the co-channel coexistence of multiple RATs for V2X, 3GPP TSG RAN WG1 Meeting #86bis, R1-1609185, Oct. 14, 2016, section 2.
3GPP TS 36.331 V15.5.0; "3rd Generation Partnership Project; Technical Specification Group Radio Access Network; Evolved Universal Terrestrial Radio Access (E-UTRA); Radio Resource Control (RRC); Protocol Specification (Release 15)"; 650 Route des Lucioles, Sophia Antipolis, Valbonne, France; (Mar. 2019).
3GPP TR 38.885 V16.0.0; "3rd Generation Partnership Project; Technical Specification Group Radio Access Network; NR; Study on NR Vehicle-to-Everything (V2X) (Release 16)"; 650 Route des Lucioles, Sophia Antipolis, Valbonne, France; (Mar. 2019).

* cited by examiner

METHODS AND APPARATUSES FOR SIDELINK OPERATIONS

CROSS-REFERENCE TO RELATED APPLICATION(S)

The present disclosure claims the benefit of and priority of provisional U.S. Patent Application Ser. No. 62/910,564, filed on Oct. 4, 2019, entitled "Sidelink Configuration on Multiple Carriers" ("the '564 provisional"). The disclosure of the '564 provisional is hereby incorporated fully by reference into the present disclosure for all purposes.

FIELD

The present disclosure is related to wireless communication, and more particularly, to methods and apparatuses for sidelink (SL) operations in wireless communication networks.

BACKGROUND

With the tremendous growth in the number of connected devices and the rapid increase in user/network traffic volume, various efforts have been made to improve different aspects of wireless communication for cellular wireless communication systems, such as fifth generation (5G) New Radio (NR), by improving data rate, latency, reliability and mobility.

The 5G NR system is designed to provide flexibility and configurability to optimize the network services and types, accommodating various use cases such as Vehicle to Vehicle (V2V), Vehicle to Pedestrian (V2P), and Vehicle to Everything (V2X) communications.

However, as the demand for radio access continues to increase, there exists a need for further improvements in the art.

SUMMARY

The present disclosure is related to methods and apparatuses for SL operations.

According to a first aspect of the present disclosure, a user equipment (UE) includes one or more non-transitory computer-readable media containing computer-executable instructions embodied therein and at least one processor coupled to the one or more non-transitory computer-readable media. The at least one processor is configured to receive an indicator indicating that Long-Term-Evolution (LTE)-Vehicle to Everything (V2X) sidelink (SL) communication is shared with New Radio (NR) SL communication on at least one of one or more carrier frequencies, and select one of the one or more carrier frequencies for the NR SL communication.

In an implementation of the first aspect, the indicator is received through one of: an SL pre-configuration; an SL configuration from a serving cell through a Uu interface; and an SL configuration from another UE via a PC5 air interface through Radio Resource Control (RRC) signaling.

In an implementation of the first aspect, the at least one processor is further configured to execute the computer-executable instructions to: in a case that the selected one of the one or more carrier frequencies is associated with the indicator, implement a frequency shift on the selected carrier frequency while receiving one or more NR SL packets.

In another implementation of the first aspect, the at least one processor is further configured to execute the computer-executable instructions to: in a case that the selected one of the one or more carrier frequencies is associated with the indicator, implement a frequency shift on the selected carrier frequency while searching for a synchronization-reference (Sync-Ref) UE synchronized with a Radio Access Network (RAN) as an NR SL synchronization reference on the selected carrier frequency.

In yet another implementation of the first aspect, the RAN is an Evolved Universal Terrestrial Radio Access Network (E-UTRAN) or a New Radio-RAN (NR-RAN).

In yet another implementation of the first aspect, the at least one processor is further configured to execute the computer-executable instructions to: in a case that the selected one of the one or more carrier frequencies is associated with the indicator, implement a frequency shift on the selected carrier frequency when the UE is configured to implement Global Navigation Satellite System (GNSS)-synchronization priority rules on the selected carrier frequency and configured to consider synchronization-reference (Sync-Ref) UEs directly synchronized with a Radio Access Network (RAN) as candidates of synchronization references for the NR SL communication.

In yet another implementation of the first aspect, the at least one processor is further configured to execute the computer-executable instructions to: in a case that the selected one of the one or more carrier frequencies is associated with the indicator, implement a frequency shift on the selected carrier frequency when the UE is configured to implement Global Navigation Satellite System (GNSS)-synchronization priority rules on the selected carrier frequency and configured to consider synchronization-reference (Sync-Ref) UEs indirectly synchronized with a Radio Access Network (RAN) as candidates of synchronization references for the NR SL communication.

In yet another implementation of the first aspect, the at least one processor is further configured to execute the computer-executable instructions to: in a case that the selected one of the one or more carrier frequencies is associated with the indicator, implement a frequency shift on the selected carrier frequency while transmitting an NR SL synchronization signal burst set as a synchronization-reference (Sync-Ref) UE on the selected carrier frequency.

In yet another implementation of the first aspect, the indicator includes a radio access technology (RAT)-shared bit associated with one carrier frequency in an NR SL frequency carrier configuration.

In yet another implementation of the first aspect, the at least one processor is further configured to execute the computer-executable instructions to: in a case that the selected one of the one or more carrier frequencies is associated with the indicator, implement a frequency shift on the selected carrier frequency during an NR SL reception if the RAT-shared bit is set to true.

According to a second aspect of the present disclosure, a method for wireless communication performed by a UE is provided. The method includes receiving an indicator indicating that a Long-Term-Evolution (LIE)-Vehicle to Everything (V2X) sidelink (SL) communication is shared with New Radio (NR) SL communication on at least one of one or more carrier frequencies, and selecting one of the one or more carrier frequencies for the NR SL communication.

In an implementation of the second aspect, the indicator is received through one of: an SL pre-configuration; an SL configuration from a serving cell through a Uu interface; and an SL configuration from another UE via a PC5 air interface through Radio Resource Control (RRC) signaling.

In another implementation of the second aspect, the method further includes in a case that the selected one of the one or more carrier frequencies is associated with the indicator, implementing a frequency shift on the selected one of the one or more carrier frequencies while receiving one or more NR SL packets.

In yet another implementation of the second aspect, the method further includes in a case that the selected one of the one or more carrier frequencies is associated with the indicator, implementing a frequency shift on the selected carrier frequency while searching for a synchronization-reference (Sync-Ref) UE synchronized with a Radio Access Network (RAN) as an NR SL synchronization reference on the selected carrier frequency.

In yet another implementation of the second aspect, the RAN is an Evolved Universal Terrestrial Radio Access Network (E-UTRAN) or a New Radio-RAN (NR-RAN).

In yet another implementation of the second aspect, the method further includes in a case that the selected one of the one or more carrier frequencies is associated with the indicator, implementing a frequency shift on the selected carrier frequency when the UE is configured to implement Global Navigation Satellite System (GNSS)-synchronization priority rules on the selected carrier frequency and configured to consider synchronization-reference (Sync-Ref) UEs directly synchronized with a Radio Access Network (RAN) as candidates of synchronization references for the NR SL communication.

In yet another implementation of the second aspect, the method further includes in a case that the selected one of the one or more carrier frequencies is associated with the indicator, implementing a frequency shift on the selected carrier frequency when the UE is configured to implement Global Navigation Satellite System (GNSS)-synchronization priority rules on the selected carrier frequency and configured to consider synchronization-reference (Sync-Ref) UEs indirectly synchronized with a Radio Access Network (RAN) as candidates of synchronization references for the NR SL communication.

In yet another implementation of the second aspect, the method further includes in a case that the selected one of the one or more carrier frequencies is associated with the indicator, implementing a frequency shift on the selected carrier frequency while transmitting an NR SL synchronization signal burst set as a synchronization-reference (Sync-Ref) UE on the selected carrier frequency.

In yet another implementation of the second aspect, the indicator includes a radio access technology (RAT)-shared bit associated with one carrier frequency in an NR SL frequency carrier configuration.

In yet another implementation of the second aspect, the method further includes in a case that the selected one of the one or more carrier frequencies is associated with the indicator, implementing a frequency shift on the selected carrier frequency during an NR SL reception if the RAT-shared bit is set to true.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
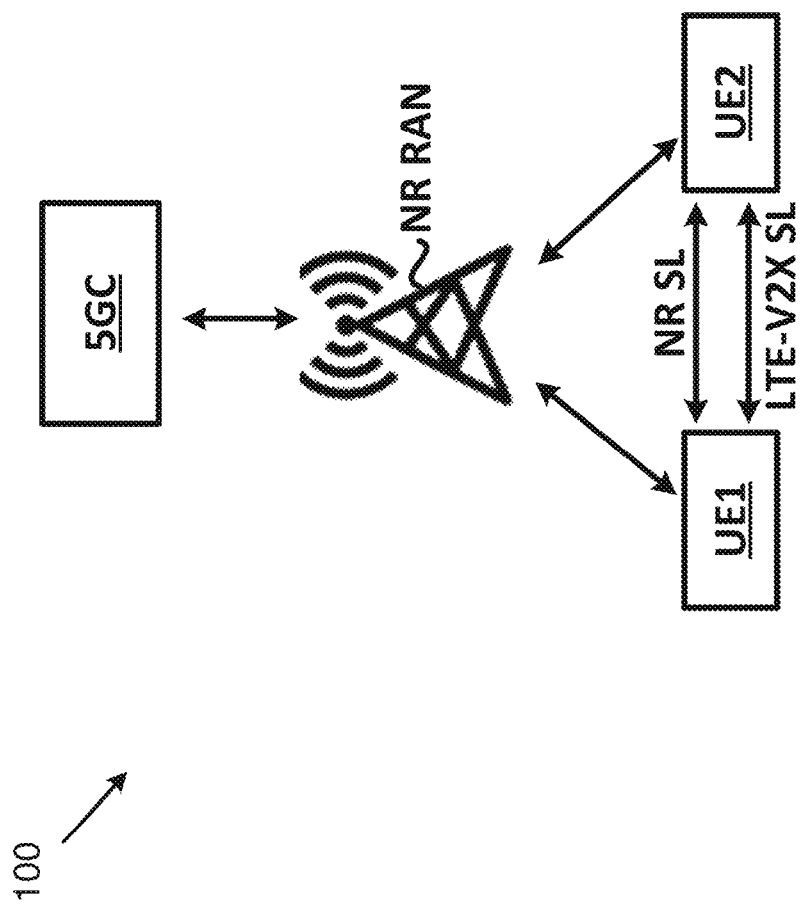
FIG. 1 is a diagram illustrating V2X SL operations, in accordance with an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally uplink (UL) resources to at least one UE within its radio coverage for DL and optionally UL packet transmissions. The BS can communicate with one or more UEs in the radio communication system via the plurality of cells.

A cell may allocate SL resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Example description of some selected terms used in this disclosure are given below.

Primary Cell (PCell): For dual connectivity (DC) operation, PCell is the master cell group (MCG) cell, operating on the primary frequency, in which the UE either performs the initial connection establishment procedure or initiates the connection re-establishment procedure.

Primary SCG Cell (PSCell): For DC operation, PSCell is the secondary cell group (SCG) cell in which the UE performs random access when performing the Reconfiguration with Sync procedure.

Special Cell: For DC operation the term Special Cell (SpCell) refers to the PCell of the MCG or the PSCell of the SCG, otherwise the term Special Cell refers to the PCell.

Secondary Cell: For a UE configured with carrier aggregation (CA), a cell providing additional radio resources on top of Special Cell.

Serving Cell: For a UE in RRC CONNECTED not configured with CA/DC, there is only one serving cell, which may be referred to as the primary cell. For a UE in RRC_CONNECTED configured with CA/DC, the term "serving cells" may be used to denote the set of cells including the SpCell(s) and all secondary cells.

Listen Before Talk (LBT) is a feature available in Wi-Fi that allows coexistence with other Wi-Fi nodes. LBT is a mechanism by which an equipment applies clear channel assessment (CCA) before using the channel. The 3rd Generation Partnership Project (3GPP) chose to specify a conservative LBT scheme similar to what Wi-Fi nodes use in order to ensure coexistence of Licensed Assisted Access (LAA) with Wi-Fi. LAA uses carrier aggregation in DL to combine LTE in the unlicensed spectrum (e.g., 5 GHz) with LTE in the licensed band. In NR, LBT may be also required prior to any transmission when operating on the unlicensed spectrum.

As stated in the $3^{rd}$ 3GPP TR38.885, a UE may be configured with either a set of GNSS (Global Navigation Satellite System)-based synchronization priority rules or a set of gNB (next generation node B)/eNB (evolved node B)-based synchronization priority rules for selecting a synchronization source on one (or more) sidelink frequency carrier(s), as shown in Table 1.

It should be noted that the synchronization rules in the presented applications may be applicable to NR sidelink synchronization (e.g., NR SL synchronization rules) and/or LTE V2X SL synchronization (e.g., LTE V2X SL synchronization rules).

TABLE 1

NR SL Synchronization source priority rules

| Priority | (Type 1) GNSS-based synchronization | gNB/eNB-based synchronization |
|---|---|---|
| P0 | GNSS | gNB/eNB |
| P1 | All UEs directly synchronized to GNSS | All UEs directly synchronized to gNB/eNB |
| P2 | All UEs indirectly synchronized to GNSS | All UEs indirectly synchronized to gNB/eNB |
| P3 | Any other UE | GNSS |
| P4 | N/A | All UEs directly synchronized to GNSS |
| P5 | N/A | All UEs indirectly synchronized to GNSS |
| P6 | N/A | Any other UE |

Thus, on a given carrier frequency, the UE may attempt to identify a target synchronization source (e.g., a target NR SL synchronization source) from the highest priority (e.g., P0) to the lowest priority (e.g., P6). In the present disclosure, the GNSS-based synchronization rules in Table 1 is also referred to as "Type1 GNSS-based synchronization rules".

According to implementations of the present application, for further enhancement, the GNSS-based synchronization rules may be further configured to include sub-priorities to further consider the impact of RAN (Radio Access Network) on the SL synchronization procedure. For example, a UE may be configured with a set of GNSS-based synchronization and gNB/eNB-based synchronization priority rules for selecting a synchronization source (e.g., an NR SL synchronization source), as shown in Table 2.

TABLE 2

Enhanced NR SL GNSS-based synchronization rules

| Priority | (Type 2) GNSS-based synchronization | gNB/eNB-based synchronization |
|---|---|---|
| P0' | GNSS | gNB/eNB |
| P1' | All UEs directly synchronized to GNSS | All UEs directly synchronized to gNB/eNB |
| P2' | All UEs indirectly synchronized to GNSS | All UEs indirectly synchronized to gNB/eNB |
| P3' | gNB/eNB | GNSS |
| P4' | All UEs directly synchronized to gNB/eNB | All UEs directly synchronized to GNSS |
| P5' | All UEs indirectly synchronized to gNB/eNB | All UEs indirectly synchronized to GNSS |
| P6' | Any other UE(s) | Any other UE(s) |

Thus, on a given carrier frequency, the UE may attempt to identify a target synchronization source from the highest priority (e.g., P0') to the lowest priority (e.g., P6').

As shown in Table 2, P3' (gNB/eNB), P4' (all UEs directly synchronized to gNB/eNB), and P5' (all UEs indirectly synchronized to gNB/eNB) may be further enabled or disabled in the UE side. The GNSS-based synchronization rules where P3', P4', and P5' are enabled is shown in Table 2. In the present disclosure, the GNSS-based synchronization rules in Table 2 is also referred to as "Type2 GNSS-based synchronization rules".

Implementations of the present disclose includes how the Type 1 and Type 2 GNSS-based synchronization rules are configured to the UE.

Referring to FIG. 1, FIG. 1 is a diagram illustrating V2X SL operations, in accordance with an example implementation of the present disclosure. In FIG. 1, at least two UEs (e.g., UE1 and UE2) may be configured in an (Access Stratum (AS)-layer/Non-Access Stratum (NAS)) unicast group to implement NR-SL (which is also referred to as NR-V2X in some applications) services and/or LTE-V2X services based on configured NR and/or LTE SL configurations (e.g., the NR SL configuration and LTE V2X configuration). It should be noted that, in some implementations, the LTE V2X services may include the LTE V2X communication through an LTE Uu interface (e.g., packets exchange through downlink/uplink direction between the UE and serving Radio Access Network) and/or the LTE V2X SL packets exchange (e.g., LTE V2X SL communication and/or LTE V2X SL discovery between UEs) through an LTE PC5 interface. Thus, in some implementations, the LTE V2X configuration may include the configuration for LTE V2X communication through the LTE Uu interface and/or the configuration for LTE V2X SL communication/LTE V2X SL discovery through the LTE PC5 interface (e.g., LTE V2X SL configuration). It should also be noted that, in some implementations, the NR SL service may include NR SL packet exchange (e.g., NR SL communication and/or NR SL discovery between UEs) through an NR PC5 interface. Therefore, in some implementations, the NR SL configuration may include the configuration for NR SL communication and/or NR SL discovery. Furthermore, the NR SL communication may include NR SL transmission (e.g., one UE transmits NR SL packets and/or SL NR control messages (e.g., SL Control Information (SCI) and/or PC5 RRC signaling) and/or NR SL synchronization signals (NR SL synchronization burst sets) to nearby UEs in the same NR SL unicast/multi-cast/broadcast groups) and/or NR SL reception (e.g., one UE receives NR SL packets and/or NR SL control messages (e.g., SCI or PC5 RRC signaling) and/or NR SL synchronization signals (NR SL synchronization burst sets) to nearby UEs in the same NR SL unicast/multi-cast/broadcast groups).

In various implementations of the present disclosure, the serving cell (e.g., an NR cell in FIG. 1) may configure multiple SL CCs and the associated RATs (or associated RANs) in the corresponding SL CCs. In accordance with an example implementation of the present disclosure, with reference to FIG. 1, at least two UEs (e.g., UE1 and UE2) may be configured in an (Access Stratum (AS)-layer/Non-Access Stratum (NAS)) multi-cast group to implement NR-SL (which is also referred to as NR-V2X in some applications) services and/or LTE-V2X services based on configured NR and/or LTE SL configurations. In various implementations of the present disclosure, the serving cell (e.g., an NR cell in FIG. 1) may configure multiple SL CCs and the associated RATs (or associated RANs) in the corresponding SL CCs. In accordance with an example implementation of the present disclosure, with reference to FIG. 1, at least two UEs (e.g., UE1 and UE2) may be configured in an AS-layer/NAS layer) broadcast group to implement NR-SL (which is also referred to as NR-V2X in some applications) services and/or LTE-V2X services based on configured NR and/or LTE SL configurations. In various implementations of the present disclosure, the serving cell (e.g., an NR cell in FIG. 1) may configure multiple SL CCs and the associated RATs (or associated RANs) in the corresponding SL CCs. It should be noted that, in some implementations, the UEs in one unicast group/multi-cast group/broadcast group may be served by one or more cells, which may be served by one or more RATs (e.g., New Radio, E-UTRA). In some other implementations, one or more UEs in the unicast group/multi-cast group/broadcast group may be out of the coverage of cellular networks (e.g., the UE could not find out at least one cell which the downlink reference signaling quality, such as the DL-RSRP, is higher than a pre-defined threshold). In addition, one out-of-coverage UE may communicate with other UEs in the same unicast/multi-cast/broadcast group based on SL-pre-configuration or configurations obtained from the neighboring UEs. A UE may join in one or more unicast/multi-cast/broadcast group(s).

The ProSe (Proximity Service) unicast group (or SL unicast group in the AS-layer) may be in-coverage, partial-coverage, or out-of-coverage with a serving RAN, that is an NR RAN connected to a 5GC (5G Core) as shown in FIG. 1. In another implementation, the ProSe unicast group (or SL unicast group in the AS-layer) may be in-coverage, partial-coverage, or out-of-coverage with a serving RAN, that is an E-UTRAN (Evolved Universal Terrestrial Radio Access Network) connected to an EPC (Evolved Packet Core).

An in-coverage UE may receive an NR or LTE SL configuration (e.g., an LTE SL configuration in accordance with the 3GPP TS 36.331.V15.5.0 or an NR SL configuration in accordance with the 3GPP TS 38.885.V16.0.0 as the baseline) through a broadcasting message (e.g., by receiving system information through broadcast or in an SI on-demand procedure) or dedicated control signaling (e.g., by receiving RRC signaling in an LTE or NR Uu interface, such as RRC(Connection)(Re)Establishment message, RRC(Connection)Release message with/without suspend configuration, RRC(Connection)Reconfiguration message with/without mobilitycontrolinfoV2X, or RRC(Connection) Reconfiguration message with/without reconfigurationwithsync message. The reconfigurationwith-sync/mobilitycontrolinfoV2X message may be delivered when the serving RAN instructs a UE to implement (intra-RAT/inter-RAT) handover procedure (e.g., Secondary Cell Group change, etc.) from its serving cell(s).

An out-of-coverage or partial-coverage UE may receive an NR or LTE SL configuration from other UEs (e.g., through a PC5 RRC message exchange via an NR PC5 interface, through an SL MIB broadcast by neighboring UEs, or through other dedicated control signaling transmitted by a Physical Sidelink Control Channel, a Physical Sidelink Shared Channel, or a Physical Sidelink Feedback Channel). Moreover, a UE may apply an SL pre-configuration, which may be installed in the USIM (UMTS Subscriber Identity Module) or in a memory module of the UE, when the UE is out of the RAN coverage and does not receive an LI'E or NR SL configuration from neighboring UEs. In some implementations, the UE may store (any combinations of) the NR SL configuration and/or LTE V2X SL configuration as the SL pre-configuration stored on the UE side.

To implement NR SL synchronization in an SL component carrier (CC) (or frequency carrier), a UE may obtain the SL synchronization rules through the approaches described above. In an SL unicast group, a UE may play a role as a group leader or manager to manage the SL resource(s) and SL configuration(s) within the SL unicast group, for example, by transmitting PC5 RRC messages to other UEs within the SL unicast group. It is noted that the transmission of PC5 RRC messages is not limited by the SL group leader/manager. For example, any member UE in one SL group may also exchange PC5 RRC messages with other member UEs.

It is noted that the description above may also be applicable to an SL multi-cast group and in an SL broadcast scenario. For example, an SL multi-cast group/SL broadcast scenario may include two or more UEs in the SL group. In addition, one or more group leaders/managers and at least two group members may be configured in the SL multi-cast group.

According to various implementations of the present disclosure, SL carrier aggregation (CA) is also considered. For example, to support NR-SL service (or LTE-V2X service), both UE1 and UE2 are configured with N (N≥1) component carriers (e.g., CC #1~CC #N). However, it is worthy to note that different RATs (in Uu interface) may be deployed on different SL CCs (each having a carrier frequency). For example, an NR-RAN is deployed in CC #1 and NR cells in CC #1 can provide an NR SL configuration through broadcasting system information or through dedicated control signaling. In contrast, E-UTRAN is deployed in CC #2 and LTE Cells in CC #2 can also provide an NR SL configuration through broadcasting system information or through dedicated control signaling. So, it is clear that one UE may need to identify the RATs associated with each of the SL CCs. In addition, different NR SL synchronization rules (e.g., as shown in Tables 1 and 2) may be configured respectively to each SL CC.

Various implementations of the present disclosure are further discussed below. In some implementations, both UEs may exchange SL control signaling by using PC5 RRC messages. For example, UE #1 may play a role as a '(ProSe) group leader' (or an SL group leader in the AS layer) in the SL unicast group, which may include UE #1 and UE #2. Thus, in the present disclosure, the signaling exchange may also include PC5 RRC message in the NR PC5 interface. In addition, implementations of the present disclosure do not exclude PC5 RRC message exchange supported in the LYE PC5 interface in its enhanced version. It should also be noted that the implementations of the present disclosure are not limited by NR-SL services or LTE-V2X services. That is, the implementations of the present disclosure may also be applicable to other services implemented through SL operations on LTE PC5 interface and/or NR PC5 interface.

In an explicit signaling approach, a serving cell (e.g., the NR cell in FIG. 1) may configure multiple SL CCs and the associated RAT (or also called associated RAN in some implementations) in the corresponding SL CC. In Table 3, one SL CC may be configured with one associated RAT since both NR-RAN and E-UTRAN may configure one or more NR SL configurations to support NR-SL services. It should be noted that Table 3 may also be applied to LTE-V2X services.

TABLE 3

| SL CCs and Associated RAT (RAN) to support NR-SL services | |
|---|---|
| SL CC | Associated RAT (RAN) to support NR-SL service |
| CC#1 | LTE |
| CC#2 | NR |
| CC#3 | N.A. |
| CC#i | NR |
| ... | ... |
| CC#N | LTE |

As shown in Table 3, one SL CC may be associated with an LTE or NR RAT. The UE may implement cell (re) selection based on the associated RAT. In some implementations, one SL CC may not be associated with an LTE or NR RAT (e.g., no associated RAT in the CC #3). In some implementations, both an NR-RAN (which may include the public network or non-public network) and an E-UTRAN may be deployed and share one CC. So, the UE may still try to scan both LTE Cells and/or NR Cells on CC #3. In some implementations, the "N.A." in the associated RAT means neither an LIE RAN nor an NR RAN would be deployed in the CC #3. In some implementations, only the RAT that is different with the RAT of the serving cell (or camped cell) may be further indicated. For example, when an NR cell is configuring an SL CC with its associated RAT, the NR RAT may be considered as a default setting in the SL configuration. Also, no specific indicator would be provided to the SL CC if it is associated with NR RAT. In contrast, an explicit indicator, such as "LTE" or "E-UTRA" or "E-UTRAN", may be further provided by the serving NR cell while the SL CC is associated with LTE network. Similar rules may also be applied to an LTE cell. For example, when an LTE cell is configuring with its associated RAT, the LTE RAT may be considered as a default setting in the configuration and so no specific indicator would be provided to the SL CC if it is associated LTE RAT. In contrast, an explicit indicator, such as "NR" or "New Radio", may be further provided by the serving LTE cell (or camped LTE cell) while the SL CC is associated with NR network.

It should be noted that UE may receive the associations shown in Table 3 through SL pre-configuration (which is stored in the USIM or memory module of the UE), system information broadcast by serving (or selected) NR/LTE cell, dedicated control signaling (e.g., RRC message delivered by NR/LTE cell) from serving cell or control signaling (e.g., PC5 RRC message) transmitted by another UE.

It should also be noted that, through explicit signaling, each SL CC may be associated with an ARFCN (absolute radio-frequency channel number) or an NR-ARFCN (New Radio-ARFCN) to indicate the location of the SL CC in the frequency domain. In addition, to the CC that is associated with an NR RAT, the associated numerology (e.g., cyclic prefix length or subcarrier spacing) may be further indicated. In some cases, it is possible that only an NR-ARFCN and a sub-carrier spacing are configured to the UE. Implementations of the present disclosure provide assistance information to improve the efficiency when the UE is doing cell (re)selection on the concerned NR frequency.

In Table 3-1, one SL CC may be configured with one associated standalone or non-standalone NR RAN to support NR-SL services. It should be noted that Table 3-1 may also be applied to LTE-V2X services.

TABLE 3-1

| SL CCs and Associated standalone/non-standalone RAT (RAN) to support NR-SL services | |
|---|---|
| SL CC | Associated RAT (RAN) to support V2X service |
| CC#1 | LTE |
| CC#2 | NR (e.g., Standalone NR RAN) |
| CC#3 | N.A. |
| CC#i | NR (e.g., Non-standalone NR RAN) |
| ... | ... |
| CC#N | LTE |

It should also be noted that, in some implementations, the SL CC configurations may cover both non-standalone (NSA) NR-RAN (e.g., CC #i in Table 3-1) and standalone NR-RAN (e.g., CC #2 in Table 3-1). The NSA NR cells may also broadcast NR-SL and/or LTE-V2X configurations through system information. Thus, the UE may also be able to implement NR-SL/LTE-V2X service(s) based on the configuration provided by the NR NSA cells. In other words, cell (re)selection for V2X service(s) on this non-serving frequency may still be applied and it may not impact the cell (re)selection procedure implemented in the Uu interface. In some implementations, there is no further indication to indicate whether NSA NR-RAN or SA NR-RAN is deployed in the specific component carrier (as shown in Table 3). In some implementations, further indications (e.g., NSA NR RAN or SA NR RAN, as shown in Table 3-1) may be provided when the RAN/UE is indicating the supported SL CC with the supported NR RAT. In some implementations, only "NSA NR" is further indicated in the configuration and no additional indicator to SL CC which is associated with NR standalone network. In other words, an SA NR RAN may be a default setting if no additional indicator is provided to the associated SL CC and vice versa. In some implementations, the UE may store the mapping configuration in Table 3 or Table 3-1 as the supporting information when the UE performs a frequency prioritization procedure during a cell (re)selection procedure in the NR/LTE Uu interface. In some implementations, the UE may not prioritize a CC, of which only NSA NR RAN is deployed on the concerned frequency carrier, when the UE gives a higher priority to CC during the cell (re)selection procedure for camped cell decision in the Uu interface. Also, in some implementations, the UE may not prioritize a CC which is associated with LTE RAT when the UE gives a higher priority to a CC during the cell (re)selection procedure based on whether the particular V2X service is supported on the concerned SL CC.

To an NR UE connected with a NR serving cell (e.g., in an NR RRC Connected state), the UE may indicate its capability of supporting LTE Uu interface/LTE-PC5 interface (or whether the UE is capable to include eNB as the target in NR SL synchronization rules) to its serving cell through UE Assistant Information (UEAssistanceInformation). To an RRC Connected UE, the serving cell may configure the SL components and associated RAT(s) based on the RAT supported by the UE. In other words, to a UE that only supports NR Uu/PC5 interface would not expect to be configured with an SL CC only associated with an LTE Uu or LIE PC5 interface. In some implementations, another bit (e.g., in the UECapabilityInformation or UEAssistanceInformation transmitted by the UE to the serving cell) may be used for the UE to report that whether it supports NR-PC5 interface (and/or LTE PC5 interface) or whether the UE is capable to include a gNB/eNB as the target in NR SL synchronization rules.

In some implementations, the serving base station (that configures and maintains the serving cell of the UE) may obtain the UE capability from the signaling of other (NR/E-UTRA) base stations or from the core network through a backhaul connection. The UEAssistanceInformation element may also be applicable to NR Uu/NR PC5 interface when an LTE cell is configuring associated RATs with the configured SL CC(s).

In some implementations, an SL CC may be shared by multiple operators (e.g., the unlicensed Intelligent Transport System (ITS) band), and thus different network deployments may be applied to the SL CC. For example, the SL CC and associated RAT in Table 3 (or Table 3-1) may be a PLMN-specific configuration or mapping. Therefore, in some implementations, the RAN or UE may deliver the mapping information (as shown in Table 3/Table 3-1) with an associated PLMN identity. The PLMN identity is a unique identity composed by (at least) mobile county code (MCC) and mobile network code (MNC). In a RAN, a cell may be shared by different PLMNs. Thus, the cell may broadcast PLMN identity(-ies) to indicate the PLMN(s) supported by the cell. On the UE side, the UE may subscribe the NR-SL/LTE-V2X service(s) with its registered telecom operator, and the operator may deploy at least one PLMN to support the subscribed UEs. So, the UE may access the RAN and implement SL operation based on the given configuration associated with the registered PLMN (e.g., Home PLMN or equivalent HPLMN). To enable UEs to implement NR-SL/LTE-V2X service(s) based on the SL configurations of their registered PLMNs, the RAN may deliver mapping information (e.g., PLMN-specific mapping associated with multiple PLMNs) to the UEs (which have registered to different PLMNs). The RAN may deliver the mapping information (as shown in Table 3 or Table 3-1) of multiple PLMNs by broadcasting system information or through dedicated RRC signaling. In a PC5 interface, the UE may deliver the mapping information of multiple PLMNs by broadcasting a MIB-SL (MasterInformationBlock_sidelink) or through (broadcasting/multicasting/unicasting) a PC5 RRC message.

It is also note that the PLMN in the present disclosure may also cover a Non-Public-Network (NPN) scenario. In some implementations, the NPN scenario may be a Stand-alone Non-Public Network (SNPN) (e.g., the RAN is operated by an NPN operator and it does not rely on network functions provided by a PLMN). In some implementations, the NPN scenario may be a Public network integrated NPN (PNI-NPN) (e.g., a non-public RAN is deployed with the support of a PLMN). The SNPN(s) may be identified by the UEs based on their PLMN IDs and/or Network IDs (NIDs) broadcast in SIB1 of a cell that supports an SNPN. The PNI-NPN may be identified by a PLMN ID and/or a Cell Access Group (CAG) ID broadcast in SIB1 of a cell that supports a PNI-NPN.

In some implementations, in the mapping information, each associated PLMNs may be represented by a "PLMN index". The "PLMN index" is decided based on the sequence of PLMNs shown in the PLMN identity list, which may be broadcast by the cell in system information (e.g., SIB1).

As shown in Table 4, a PLMN identity list is provided in the system information. In addition, PLMN ID #a is the first PLMN shown in the PLMN identity list and PLMN ID #b is the second PLMN shown in the PLMN identity list. To reduce signaling overhead, the PLMN indicated by PLMN ID #a may be further associated with a PLMN index having a value of 0 and the PLMN indicated by PLMN ID #b may be further associated with a PLMN index having a value of 1, for example. So, the mapping information may be associated with the PLMN indices accordingly. On the UE side, the UE may interpret and/or determine which PLMN is associated with the configured mapping configuration by receiving the PLMN identity list from the system information. The mapping rules between the PLMN identities and the PLMN indices may be pre-specified in technical specification or being stored in the UE. Therefore, the PLMN index mapping provided in Table 4 may also be applicable to configure the PLMN-specific mapping information (Table 3/Table 3-1) between SL CC and associated RAT(s).

TABLE 4

| PLMN index configurations and associated PLMN identities | |
|---|---|
| PLMN Identity list (in SIB1) | PLMN index |
| PLMN ID#a | 0 |
| PLMN ID#b | 1 |
| PLMN ID#c | 2 |
| . . . | . . . |
| PLMN ID#N | N-1 |

In some implementations, a UE may be configured with one or more SL CCs (or frequency carriers) with associated NR SL synchronization rules (which includes at least Type 1/Type2 GNSS synchronization rules and gNB/eNB-based synchronization), as shown in Table 5-1.

TABLE 5-1

| SL CCs and associated NR SL synchronization rules | |
|---|---|
| SL CC | Synchronization rules |
| CC#1 | Type 1 GNSS synchronization rules |
| CC#2 | Type 2 GNSS synchronization rules |
| CC#i | gNB/eNB-based synchronization rules |
| . . . | . . . |
| CC#N | Type 2 GNSS synchronization rules |

In some implementations, two indicators may be provided to configure the NR SL synchronization rules, as shown in Table 5-2.

TABLE 5-2

Two indicators or one bitmap for indicating NR SL synchronization rules associated with each configured SL CC

| SL CC | NR SL Synchronization rules | gNB/eNB bit | Bitmap ($1^{st}$ bit, $2^{nd}$ bit) |
|---|---|---|---|
| CC#1 | GNSS-based | Enabled | (01) |
| CC#2 | GNSS-based | Disabled | (00) |
|  | gNB/eNB-based | N.A. | (11) |
| CC#N | GNSS-based | Enabled | (01) |

The IE 'synchronization rules' may be designed to indicate 'GNSS-based synchronization rules' or 'gNB/eNB-based synchronization rules'. Then, another indicator 'gNB/eNB enable bit' may be further provided to indicate Type 1 GNSS-based synchronization rules (gNB/eNB bit is 'disabled') or Type 2 GNSS-based synchronization rules (gNB/eNB bit is 'enabled'). Also, in Table 5-2, a bitmap may be provided accordingly. The first bit in the bitmap indicates GNSS-based synchronization rules (e.g., by configuring '0' (or 'false') in the first bit) or gNB/eNB-based synchronization rules (e.g., by configuring '1' (or 'true') in the first bit). Then, the second bit in the bitmap indicates whether P3/P4/P5 is disabled (e.g., by configuring '0' (or 'false') in the second bit) or P3/P4/P5 is enabled (e.g., by configuring '1' (or 'true'/'enabled') in the second bit) if the first bit is set to '0' (or 'false'/'disabled'). In addition, the value (1, 0) may be reserved in this bitmap for other usages. In some other implementations, the bitmap and the values '0' and '1' shown in Table 5-2 may be replaced by Choice {GNSS-based, gNB/eNB}, Enumeration (e.g., 'enabled', 'disabled'), and Boolean Value (e.g., 'true', 'false') in the ASN.1 signaling design.

In some implementations, a set of default GNSS-based synchronization rules may be pre-specified (e.g., pre-defined in 3GPP technical specification) or pre-configured. For example, Type 1 (or Type 2) GNSS-based synchronization rules may be pre-specified in 3GPP specifications as the default GNSS-based synchronization rules. Then, in the explicit signaling approach, the serving RAN may only need to further indicate the SL CC(s) which is associated with the Type 2 GNSS-based synchronization rules. For example, in the 3GPP specifications, Type 1 GNSS-based synchronization rules may be the default GNSS-based synchronization rules. Then, the serving RAN may further transmit one indicator to the UE to configure the UE to consider the RAN (e.g., NR-RAN, E-UTRAN) into the synchronization sources decision (e.g., while Type 2 GNSS-based synchronization rules is configured to the UE).

TABLE 5-3

One indicator for indicating NR SL synchronization rules associated with each configured SL CC by configuring one default setting in the GNSS-based synchronization rules

| SL CC | NR SL Synchronization rules | gNB/eNB bit |
| --- | --- | --- |
| CC#1 | GNSS-based | Enabled |
| CC#2 | GNSS-based | N.A. |
|  | gNB/eNB-based | N.A. |
| CC#N | GNSS-based | Enabled |

In some implementations, the UE may receive the associations shown in Tables 5-1, 5-2, and 5-3 through SL pre-configuration (e.g., stored in the USIM or memory module of the UE), broadcasting system information from serving cell (or selected) NR/LTE cell, dedicated control signaling (e.g., RRC Connection Reconfiguration message deliver or other types of RRC signaling from NR Cell or LTE Cell) from the serving cell or dedicated control signaling (e.g., PC5 RRC message) transmitted by another UE.

In some implementations, the indications provided in Tables 5-1, 5-2, and 5-3 may be PLMN-specific, and the (NR/LTE) cell or UE may deliver the mapping information (based on the associations provided in Tables 5-1, 5-2, and 5-3) with an associated PLMN identity. In addition, the (NR/LTE) cell or UE may deliver the NR SL synchronization rules associated with different PLMN identities. In some implementations, the PLMN-index associated configuration (as shown in Table 4) may not be limited by the mapping information shown in Table 3/Table 3-1 but may also cover the associated NR SL synchronization rules described in the present disclosure. Therefore, the RAN/UE may also deliver the PLMN-specific synchronization rules through broadcasting messages or dedicated control signaling.

It should be noted that, in some implementations, the NR SL synchronization rules may be UE-specific. For example, only one set of rules (Type 1 or Type 2 GNSS-based synchronization rules or gNB/eNB-based synchronization rules) may be configured to a UE and the configured NR SL synchronization rules may be generally applied to all the configured SL CCs to one UE. In other words, the UE may apply just one set of NR SL synchronization rules to all the configured SL CCs during SL synchronization procedure. In addition, different NR SL synchronization rules may be provided based on UE type (e.g., an NR UE or an LTE UE). For example, an NR UE represents a UE served by an NR cell using a (NR) Uu interface, and an LTE UE represents a UE served by an LTE cell using a (LTE) Uu interface. In addition, the serving NR cell and serving LTE cell may configure NR SL/LTE V2X SL synchronization rules to an NR UE and an LTE UE, respectively. In some implementations, an LTE cell may configure a set of generally applied SL synchronization rules (e.g., either Type 1, Type 2 GNSS-based synchronization rules or gNB/eNB-based synchronization rules) to all LTE UEs to implement NR-SL service(s) in one or more SL CCs. In some implementations, an NR cell may configure a set of generally applied SL synchronization rules (either Type 1/Type 2 GNSS-based synchronization rules or gNB/eNB-based synchronization rules) to all NR UEs to implement NR-SL service(s) on one or more SL CCs.

In some implementations, the associated synchronization rules may be valid within one or more validity areas. For example, the configurations in Table 5-3 may be transmitted through broadcasting system information. In addition, the configured SL synchronization rules is valid in one systeminformationareaID. So, the UE may apply the synchronization rules when the serving cell is broadcasting the same systeminformationareaID in the system information after the UE changes is serving cell through cell (re)selection procedure or handover procedure. In some implementations, the systeminformationareaID may be generally applied to all of the broadcasting system information. In some other implementations, one V2X systeminformationareaID may be specified to define the validity area of an NR-SL configuration or an LTE-V2X configuration broadcast in the system information. In some implementations, the validity area(s) associated with the synchronization rules may be specified by other approaches, which include a cell identity list (e.g., a Physical Cell identity list or cellidentity that is unique to each cell in one PLMN), a RAN notification area list, a tracking zone, a zone-based approach (e.g., by taking the zone configuration in LTE-V2X service as baseline) or through the assistance information of other RATs (e.g., Wi-Fi, Bluetooth, GNSS, NR positioning).

In some implementations, the UE may further indicate whether it supports Type 2 GNSS-based synchronization rules (e.g., an Information element to indicate true or false about whether the Type 2 GNSS-based synchronization rules would be supported) to the serving cell. The UE may provide this information in an Information Element such as UEcapabilityinformation (through the UE capability enquiry procedure initiated by the serving cell) or UEAssistanceInformation to the serving cell.

In some implementations, a UE that does not support Type 2 GNSS-based synchronization rules may fall back to Type 1 GNSS-based synchronization rules, for example when the UE is configured with Type 2 GNSS-based synchronization rules but cannot implement Type 2GNSS-based synchronization rules because of its (hardware/software) capability.

In some implementations, the enabling and disabling of P3/P4/P5 in GNSS-based synchronization rules may be addressed separately and independently. Table 6 shows a bitmap, in which each bit is associated with an enabled/disabled condition of {P3, P4, P5} respectively, may be configured to the UE (e.g., based on the signaling approaches provided in the present disclosure).

TABLE 6

A bitmap indicating the enabling and disabling of {P3, P4, P5} separately

| Priority | Enabled/Disabled bit |
| --- | --- |
| P3 gNB/eNB | 1 (Enabled) |
| P4 UE directly synchronized to gNB/eNB | 0 (Disabled) |
| P5 UE indirectly synchronized to gNB/eNB | 0 (Disabled) |

In Table 6, one bit is set to 1 (which means the associated priority is enabled, such as the P3 in Table 6) or set to 0 (which means the associated priority is disabled, such as P4 and P5 in Table 6). In some implementations, the UE may be configured with a set of GNSS-based synchronization rules with the bitmap. Thus, a new set of synchronization rules, which is different from the Type 1/Type 2 GNSS-based synchronization rules, may be configured to the UE on (at least) one concerned SL CC. Based on the configuration shown in Table 6, the concerned UE is enabled to find a gNB/eNB as the target for SL synchronization. However, the UE may not provide different priorities to Sync-Ref UE based on its synchronization sources. For example, there may not be any further differentiation to Sync-Ref UEs that is directly/indirectly synchronized with the gNB/eNB and Sync-Ref UE which is synchronized with another Sync-Ref UE.

In some implementations, the synchronization rules (e.g., in Tables 1 and 2) may be only associated with SL CCs that are associated with an NR RAT. In some implementations, the synchronization rules may be associated with SL CCs that are associated with both an LTE RAT and an NR RAT. In some additional implementations, the synchronization rules may be associated with all of the configured SL CCs without regarding to the associated RAT(s). In addition, to one configured SL CC, the associated RAT and associated synchronization rules may be provided jointly or independently.

Case 2: Implicit Approach

In an implicit approach, a UE may decide to apply whether to apply Type 1 GNSS-based synchronization rules or Type 2 GNSS-based synchronization rules based on some pre-specified or (pre-)configured triggering events. Table 7 is an implicit approach by a UE to decide the associated SL synchronization rules based on various triggering events.

TABLE 7

Implicit approach for implementing SL synchronization rules based on triggering events

| Triggering Event | Implementation |
| --- | --- |
| Event#1 UE mobility state (high speed/low speed) | Firstly, UE may decide its own mobility state based on some side information (e.g., number of cell reselections, or number of handover during an observation time period, or through the supporting information (such as UE speed) from other technique, such as NR-positioning technique). In some conditions, the UE mobility state may be further divided into three sub-states: high/medium/low mobility state.<br>Then, the Type 1/2 GNSS-based synchronization rules may be associated with specific UE mobility state.<br>For example, in one SL CC CC#i, UE may apply Type 1 GNSS-based synchronization rules while the UE is in high mobility state.<br>In contrast, UE may apply Type 2 GNSS-based synchronization rules while the UE is in low or medium mobility, (so, it may prevent a UE to change synchronization source frequently between base stations while the UE is under high mobility state)<br>It is also worthy to note that different configurations may be provided to different SL CC independently. |
| Event#2 UE power saving mode in PC5 interface | In some implementations, a UE power saving mode may be configured to the UE and so the UE may implement certain actions to reduce its power consumption on an NR V2X service.<br>If UE decides to move to SL power saving mode => UE would select Type 1 GNSS-based synchronization rules. (So, the UE may not seek higher priority UE or gNB/eNB after the UE selecting any UE as the synchronization source in the concerned SL CC).<br>It is also worthy to note that, to increase power saving gain, the UE may select Type 1 GNSS-based synchronization rules to all the configured SL CCs, or all the configured SL CCs associated with GNSS-based synchronization rules.<br>In some implementations, the UE may move back to Type 2 GNSS-based synchronization rules by itself after the UE moves out of power saving mode. |
| Event#3 Based on UE monitoring result | (1) In this implementation, Type 1 GNSS-based synchronization rules may be the default setting when the UE is configured with GNSS-based synchronization rules.<br>(2) Based on the default setting, the UE may try to synchronize with any UE without considering further prioritization between UEs. In Addition, the UE may not try to seek eNB/gNB (or higher priority UEs) in the concerned SL CC.<br>(3) Then, in this embodiment, the UE would be triggered to obey Type 2 GNSS-based synchronization rules after the UE finding (at least) one Sync-Ref UE which is directly or indirectly synchronized with eNB/gNB.<br>(4) After the UE is triggered to follow Type 2 GNSS-based synchronization rules, in some implementations, the UE may fall back to Type 1 GNSS-based synchronization rules if the UE cannot find any eNB/gNB and any UE which is directly/indirectly connected with an eNB/gNB in the concerned frequency.<br>(5) In some implementations, the synchronization rules to each SL CC may be decided independently. |

Figure 2:
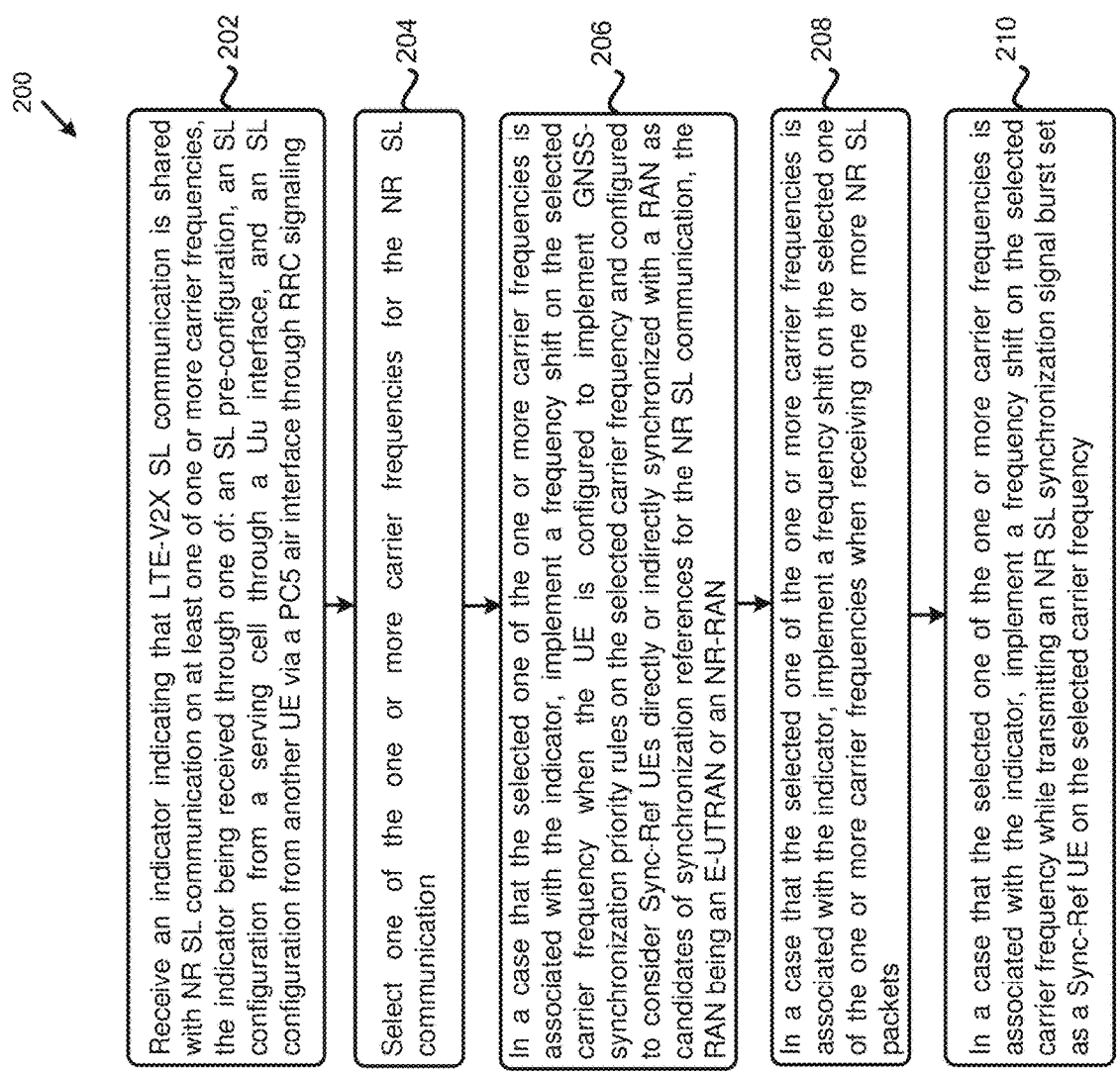
FIG. 2 is a flowchart of a method performed by a UE for V2X SL operations, in accordance with an example implementation of the present disclosure.

Referring to FIG. 2, FIG. 2 is a flowchart of a method 200 performed by a UE for V2X SL operations, in accordance with an example implementation of the present disclosure.

In action 202, the UE may receive an indicator indicating that an LTE-V2X service is shared with an NR SL service on at least one of one or more carrier frequencies. The indicator may be received through an SL pre-configuration (e.g., prestored in the UE), an SL configuration from a serving cell (e.g., through a Uu interface), and/or an SL configuration from another UE (e.g., via a PC5 air interface through RRC signaling).

In action 204, the UE may select one of the one or more carrier frequencies for SL communication.

In action 206, in a case that the selected one of the one or more carrier frequencies is associated with the indicator, the UE may implement a frequency shift (e.g., a 7.5 kHz frequency shift) on the selected carrier frequency when the UE is configured to implement GNSS-synchronization priority rules on the selected carrier frequency and configured to consider Sync-Ref UEs synchronized with a RAN as candidates of synchronization references for the SL communication. In one implementation, the Sync-Ref UEs may be directly synchronized with a RAN (e.g., a NR RAN or an E-UTRAN) as candidates of synchronization references for the SL communication. In another implementation, the Sync-Ref UEs may be indirectly synchronized with a RAN (e.g., through other Sync-Ref UEs) as candidates of NR SL/LTE V2X SL synchronization references for the SL communication.

In action 208, in a case that the selected one of the one or more carrier frequencies is associated with the indicator, the UE may implement a frequency shift (e.g., a 7.5 kHz frequency shift) on the selected one of the one or more carrier frequencies when receiving one or more NR SL packets from neighboring UEs.

In action 210, in a case that the selected one of the one or more carrier frequencies is associated with the indicator, the UE may implement a frequency shift (e.g., a 7.5 kHz frequency shift) on the selected carrier frequency while transmitting NR SL synchronization signal burst set as a Sync-Ref UE (e.g., one NR Sync-Ref UE, based on NR sidelink protocols) on the selected carrier frequency.

It should be noted that details of the SL CCs and the associated NR SL synchronization rules and RATs and indications for SL operations may be according to the descriptions in Cases 1 and 2 above.

Figure 3:
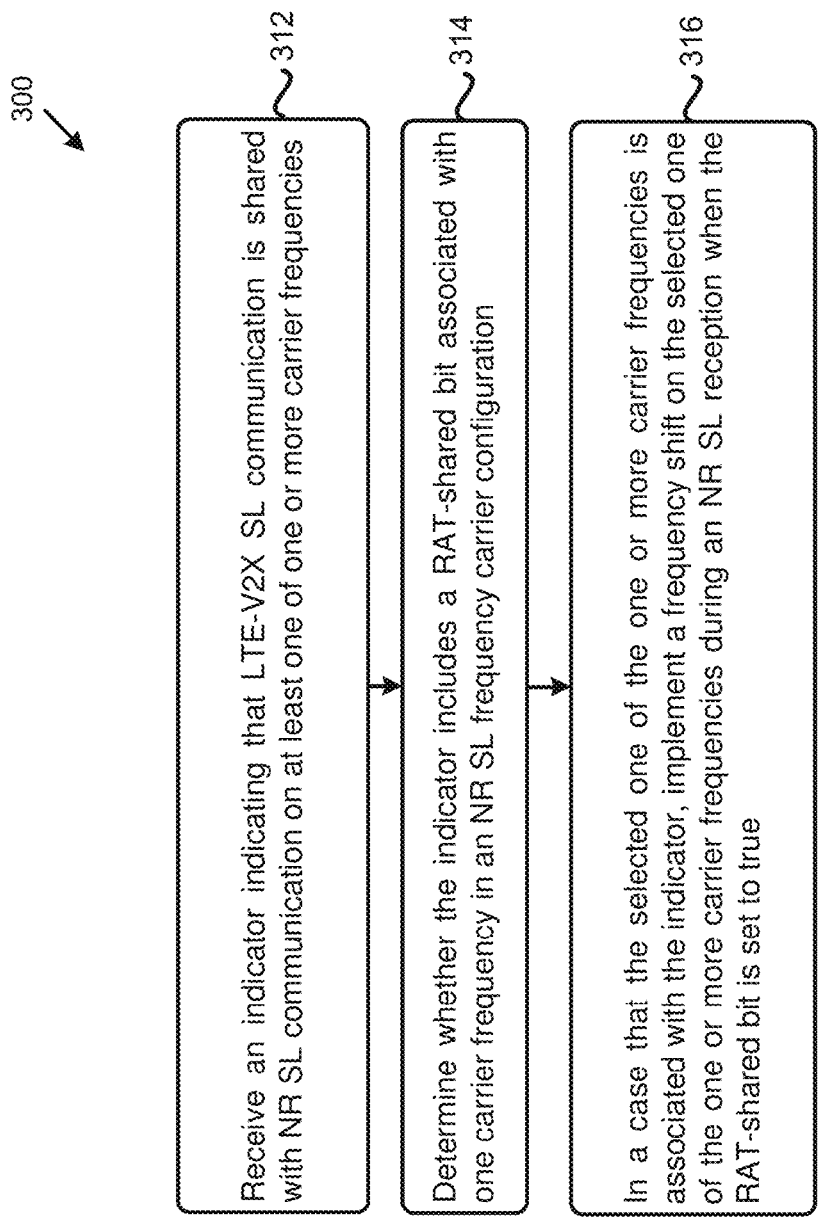
FIG. 3 is a flowchart of a method performed by a UE for V2X SL operations, in accordance with an example implementation of the present disclosure.

Referring to FIG. 3, FIG. 3 is a flowchart of a method 300 performed by a UE for V2X SL operations, in accordance with an example implementation of the present disclosure.

In action 312, the UE may receive an indicator (e.g., within the NR SL configuration) indicating that an LTE-V2X service is shared with an NR SL service on at least one of one or more carrier frequencies.

In action 314, the UE may determine whether the indicator includes a RAT-shared bit associated with one carrier frequency in an SL frequency carrier configuration).

In one implementation, the SL frequency carrier configuration may be received through an SL pre-configuration (e.g., prestored in the UE), an SL configuration from a serving cell (e.g., through a NR/E-UTRA Uu interface), and/or an SL configuration from another UE (e.g., via a PC5 air interface through PC5 RRC signaling). In one implementation, action 314 may be performed after action 202 in the method 200 shown in FIG. 2.

In action 316, in a case that the selected one of the one or more carrier frequencies is associated with the indicator, the UE may implement a frequency shift (e.g., a 7.5 kHz frequency shift) on the selected one of the one or more carrier frequencies when the RAT-shared bit is set to true. In one implementation, action 316 may be included at least one of actions 206, 208, and 210 in the method 200 shown in FIG. 2.

It should be noted that details of the SL CCs and the associated synchronization rules and RATs and indications for SL operations may be according to the descriptions in Cases 1 and 2 above.

Figure 4:
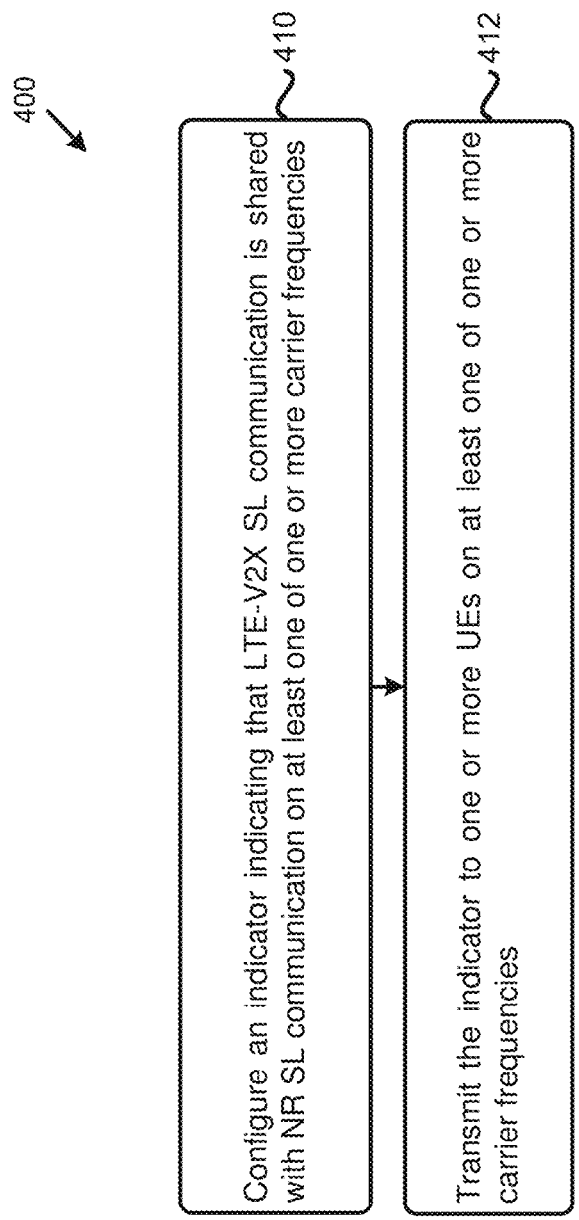
FIG. 4 is a flowchart of a method performed by a base station for NR SL operations, in accordance with an example implementation of the present disclosure.

FIG. 4 is a flowchart of a method performed by a base station for NR SL operations, in accordance with an example implementation of the present disclosure. In action 410, the base station may configure an indicator indicating that an LTE-V2X service is shared with an NR SL service. In action 412, the base station may transmit the indicator to one or more UEs on at least one of one or more carrier frequencies. In one implementation, the indicator is transmitted to the UE in an SL frequency carrier configuration. In one implementation, the base station may further configure an indicator indicating whether to apply a frequency shift (e.g., 7.5 KHz shift) in the SL frequency carrier configuration. In another implementation, the base station may configure the UE to apply a frequency shift (e.g., 7.5 KHz shift) in the associated SL frequency carrier (configuration) by reusing the indicator that an LTE-V2X service is shared with an NR SL service.

Figure 5:
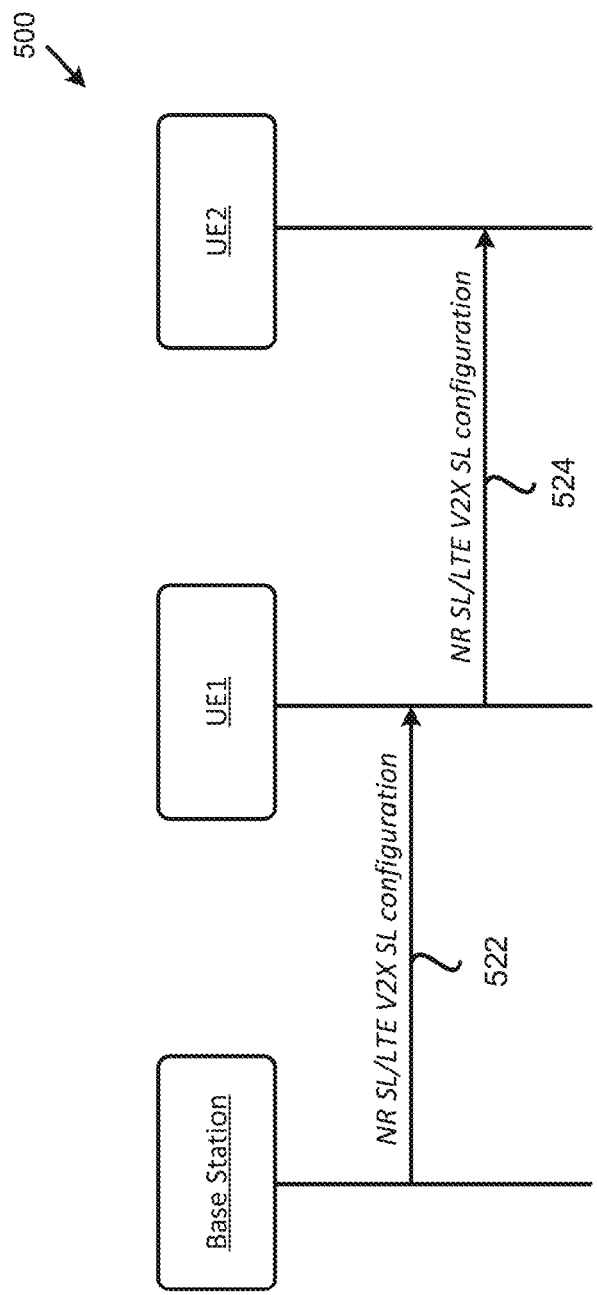
FIG. 5 is a signal flow diagram between a base station and one or more UEs, in accordance with an example implementation of the present disclosure.

FIG. 5 is a signal flow diagram between a base station and one or more UEs, in accordance with an example implementation of the present disclosure. As shown in diagram 500, in action 522, the base station may deliver an NR SL configuration (and/or an LTE V2X SL configuration) to a UE (e.g., UE #1). In action 524, the UE #1 may deliver the NR SL configuration (and/or the LIE V2X SL configuration) received from the base station to another UE (e.g., UE #2).

In some implementations, the base station may deliver NR SL configuration (and/or LTE V2X SL configuration) to the UE through UE-specific control signaling (e.g., RRC signaling through an NR Uu interface or LTE Uu interface) or broadcasting system information (e.g., NR SIB or E-UTRA SIB) directly.

The NR SL configuration includes the control parameters for the UE to implement NR SL operation (or NR SL service) in the Access Stratum (and/or Non-Access Stratum) layers and the LIE V2X SL configuration includes the control parameters for the UE to implement LTE V2X services in the Access Stratum (and/or Non-Access Stratum) layers.

In some other implementations, the UE (e.g., UE #1) may deliver the NR sidelink configuration (and/or LTE V2X SI, configuration) to another UE (e.g., UE #2) through UE-specific control signaling (e.g., PC5 RRC signaling). It should be noted that, in some implementations, the UE #1 may relay the NR SL configuration/LTE V2X SL configuration, which is obtained from the cellular network, to the UE #2 directly (e.g., based on the request from UE #2 and/or the base station). In some additional implementations, the UE #1 may generate the NR SL configuration/LTE V2X SL configuration for the UE #2 autonomously (e.g., by referring (part of) the NR SL/LTE V2X SL configuration obtained from the cellular network). Please also note, the base station may belong to the serving RAN of the UE #1 or non-serving RAN (e.g., the base stations which the UE has detected while the UE is implementing NR sidelink/LTE V2X SL service on the non-serving frequencies).

Figure 6:
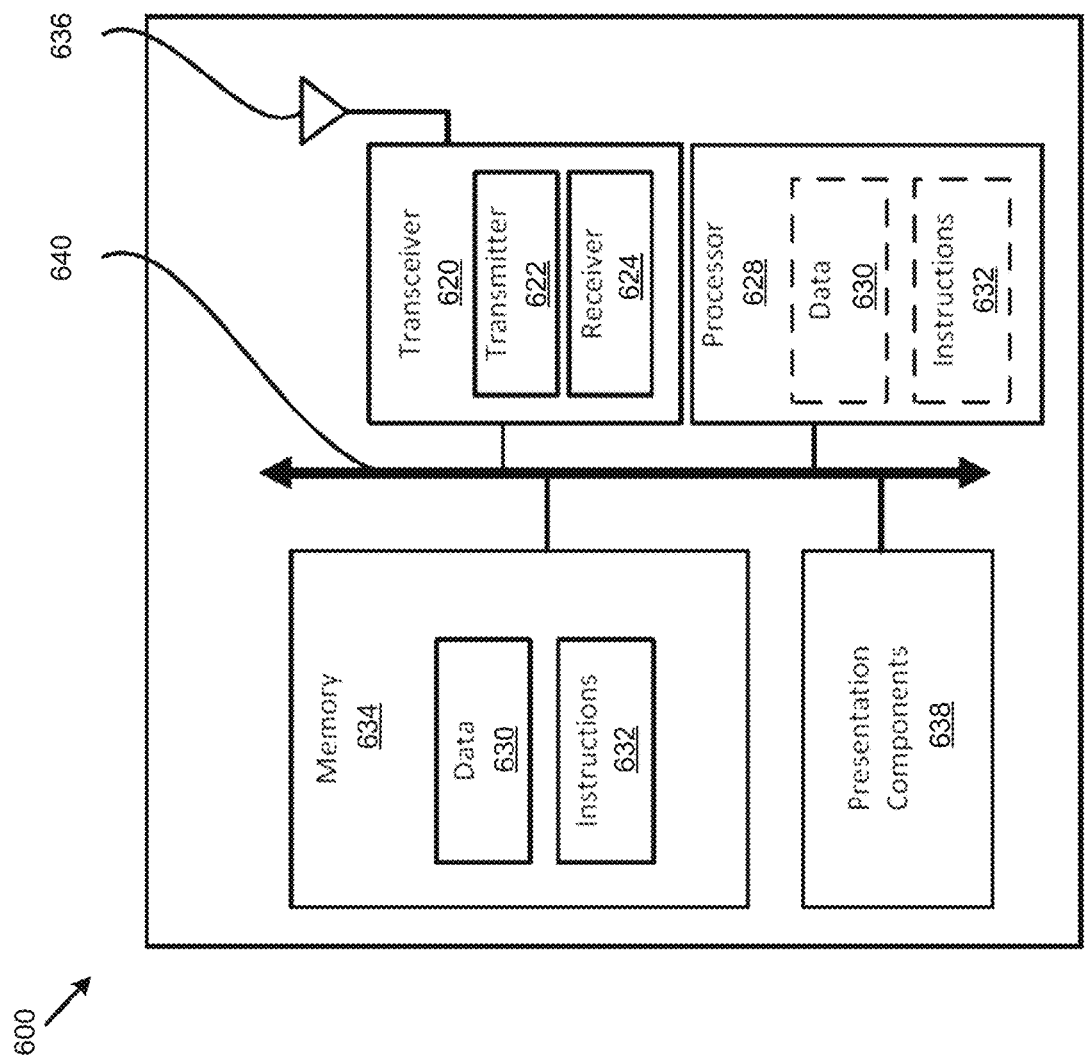
FIG. 6 is a block diagram illustrating a node for wireless communication in accordance with various aspects of the present disclosure.

FIG. 6 is a block diagram illustrating a node 600 for wireless communication according to the present disclosure. As illustrated in FIG. 6, a node 600 may include a transceiver 620, a processor 628, a memory 634, one or more presentation components 638, and at least one antenna 636. The node 600 may also include a radio frequency (RF) spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 1 through 5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory may include solid-state memory, hard drives, optical-disc drives, etc. As illustrated in FIG. 6, the memory 634 may store computer-readable, computer-executable instructions 632 (e.g., software codes) that are configured to cause the processor 628 to perform various functions disclosed herein, for example, with reference to FIGS. 1 through 5. Alternatively, the instructions 632 may not be directly executable by the processor 628 but be configured to cause the node 600 (e.g., when compiled and executed) to perform various functions disclosed herein.

The processor 628 (e.g., having processing circuitry) may include an intelligent hardware device, e.g., a Central Processing Unit (CPU), a microcontroller, an ASIC, etc. The processor 628 may include memory. The processor 628 may process the data 630 and the instructions 632 received from the memory 634, and information transmitted and received via the transceiver 620, the baseband communications module, and/or the network communications module. The processor 628 may also process information to be sent to the transceiver 620 for transmission via the antenna 636 to the network communications module for transmission to a core network.

One or more presentation components 638 may present data indications to a person or another device. Examples of presentation components 638 may include a display device, a speaker, a printing component, and a vibrating component, etc.

In some implementations of the present disclosure, configurations for NR SL/LTE V2X SL synchronization rules are utilized when multiple SL CCs are configured to support (NR/LTE) SL operations among UEs.

In some implementations of the present disclosure, information regarding SL CCs associated with NR and/or LTE RATs is indicated to the UE (e.g., through an Uu interface).

In some implementations of the present disclosure, the associations between SL CCs and the associated RATs may be PLMN-specific.

In some implementations of the present disclosure, SL CCs with associated NR SL/LTE V2X SL synchronization rules are indicated.

In some implementations of the present disclosure, the associations between SL CCs and the NR SL/LTE V2X SL synchronization rules may be PLMN-specific.

In some implementations of the present disclosure, the associations between SL CCs and the NR SL/LTE V2X SL synchronization rules may be valid within a defined validity area.

In some implementations of the present disclosure, the above-mentioned indications and/or association rules may be pre-specified in technical specifications or pre-defined in the USIM or memory module in the UE so that the UE is able to interpret and apply the above-mentioned indications and/or association rules.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE), comprising:
   one or more non-transitory computer-readable media having computer-executable instructions embodied therein; and
   at least one processor coupled to the one or more non-transitory computer-readable media, the at least one processor configured to execute the computer-executable instructions to cause the UE to:
   receive an indicator indicating that Long-Term-Evolution (LTE)-Vehicle to Everything (V2X) sidelink (SL) communication is shared with New Radio (NR) SL communication on at least a first carrier frequency in one or more carrier frequencies, the indicator including a radio access technology (RAT)-shared bit associated with the first carrier frequency in an NR SL frequency carrier configuration;
   select a second carrier frequency in the one or more carrier frequencies for the NR SL communication; and
   in a case that the second carrier frequency is the same as the first carrier frequency, implement a frequency shift on the second carrier frequency while performing one or more NR SL transmissions.

2. The UE of claim 1, wherein the indicator is received through one of:
   an SL pre-configuration;
   an SL configuration received from a serving cell through a Uu interface; or
   an SL configuration received from another UE via a PC5 air interface through Radio Resource Control (RRC) signaling.

3. The UE of claim 1, wherein the at least one processor is further configured to execute the computer-executable instructions to cause the UE to:
   in the case that the second carrier frequency is the same as the first carrier frequency, implement the frequency shift on the second carrier frequency while receiving one or more NR SL packets.

4. The UE of claim 1, wherein the at least one processor is further configured to execute the computer-executable instructions to cause the UE to:
   in the case that the second carrier frequency is the same as the first carrier frequency, implement the frequency shift on the second carrier frequency while searching for a synchronization-reference (Sync-Ref) UE synchronized with a Radio Access Network (RAN) as an NR SL synchronization reference on the second carrier frequency.

5. The UE of claim 4, wherein the RAN comprises one of an Evolved Universal Terrestrial Radio Access Network (E-UTRAN) or a New Radio-RAN (NR-RAN).

6. The UE of claim 1, wherein the at least one processor is further configured to execute the computer-executable instructions to cause the UE to:
   in the case that the second carrier frequency is the same as the first carrier frequency, implement the frequency shift on the second carrier frequency when the UE is configured to:
      implement Global Navigation Satellite System (GNSS)-synchronization priority rules on the second carrier frequency, and
      consider synchronization-reference (Sync-Ref) UEs directly synchronized with a Radio Access Network (RAN) as candidates of synchronization references for the NR SL communication.

7. The UE of claim 1, wherein the at least one processor is further configured to execute the computer-executable instructions to cause the UE to:
   in the case that the second carrier frequency is the same as the first carrier frequency, implement the frequency shift on the second carrier frequency when the UE is configured to:
      implement Global Navigation Satellite System (GNSS)-synchronization priority rules on the second carrier frequency, and
      consider synchronization-reference (Sync-Ref) UEs indirectly synchronized with a Radio Access Network (RAN) as candidates of synchronization references for the NR SL communication.

8. The UE of claim 1, wherein the at least one processor is further configured to execute the computer-executable instructions to cause the UE to:
   in the case that the second carrier frequency is the same as the first carrier frequency, implement the frequency shift on the second carrier frequency while transmitting an NR SL synchronization signal burst set as a synchronization-reference (Sync-Ref) UE on the second carrier frequency.

9. The UE of claim 1, wherein the at least one processor is further configured to execute the computer-executable instructions to cause the UE to:
   in the case that the second carrier frequency is the same as the first carrier frequency, implement the frequency shift on the second carrier frequency during an NR SL reception if the RAT-shared bit is set to true.

10. A method performed by a user equipment (UE), the method comprising:
    receiving an indicator indicating that Long-Term-Evolution (LTE)-Vehicle to Everything (V2X) sidelink (SL) communication is shared with New Radio (NR) SL communication on at least a first carrier frequency in one or more carrier frequencies, the indicator including a radio access technology (RAT)-shared bit associated with the first carrier frequency in an NR SL frequency carrier configuration;
    selecting a second carrier frequency in the one or more carrier frequencies for the NR SL communication; and
    in a case that the second carrier frequency is the same as the first carrier frequency, implementing a frequency shift on the second carrier frequency while performing one or more NR SL transmissions.

11. The method of claim 10, wherein the indicator is received through one of:
    an SL pre-configuration;
    an SL configuration received from a serving cell through a Uu interface; or
    an SL configuration received from another UE via a PC5 air interface through Radio Resource Control (RRC) signaling.

12. The method of claim 10, further comprising:
    in the case that the second carrier frequency is the same as the first carrier frequency, implementing the frequency shift on the second carrier frequency while receiving one or more NR SL packets.

13. The method of claim 10, further comprising:
    in the case that the second carrier frequency is the same as the first carrier frequency, implementing the frequency shift on the second carrier frequency while searching for a synchronization-reference (Sync-Ref) UE synchronized with a Radio Access Network (RAN) as an NR SL synchronization reference on the second carrier frequency.

14. The method of claim 13, wherein the RAN comprises one of an Evolved Universal Terrestrial Radio Access Network (E-UTRAN) or a New Radio-RAN (NR-RAN).

15. The method of claim 10, further comprising:
    in the case that the second carrier frequency is the same as the first carrier frequency, implementing the frequency shift on the second carrier frequency when the UE is configured to:
       implement Global Navigation Satellite System (GNSS)-synchronization priority rules on the second carrier frequency, and
       consider synchronization-reference (Sync-Ref) UEs directly synchronized with a Radio Access Network (RAN) as candidates of synchronization references for the NR SL communication.

16. The method of claim 10, further comprising:
    in the case that the second carrier frequency is the same as the first carrier frequency, implementing the frequency shift on the second carrier frequency when the UE is configured to:
       implement Global Navigation Satellite System (GNSS)-synchronization priority rules on the second carrier frequency, and consider synchronization-reference (Sync-Ref) UEs indirectly synchronized with a Radio Access Network (RAN) as candidates of synchronization references for the NR SL communication.

17. The method of claim 10, further comprising:
in the case that the second carrier frequency is the same as the first carrier frequency, implementing the frequency shift on the second carrier frequency while transmitting an NR SL synchronization signal burst set as a synchronization-reference (Sync-Ref) UE on the second carrier frequency.

18. The method of claim 10, further comprising:
in the case that the second carrier frequency is the same as the first carrier frequency, implementing the frequency shift on the second carrier frequency during an NR SL reception if the RAT-shared bit is set to true.

* * * * *